Daniel I. Gordon
Robert S. Sery
INVENTORS 3,192,078
METHOD OF MAKING MAGNETIC CORES HAVING RECTANGULAR HYSTERESIS LOOPS BY BOMBARDMENT WITH ELECTRONS
Daniel I. Gordon, Chevy Chase, and Robert S. Sery, Silver Spring, Md., assignors to the United States of America as represented by the Secretary of the Navy
Filed Dec. 30, 1963, Ser. No. 334,675
3 Claims. (Cl. 148—100)
(Granted under Title 35, U.S. Code (1952), sec. 266)

The invention described herein may be manufactured and used by or for the Government of the United States of America for governmental purposes without the payment of any royalties thereon or therefor.

The present invention relates to a method of treating materials of high magnetic permeability in such a way as to increase the steepness of the magnetization curves and accentuate the rectangularity of the hysteresis loops exhibited by these materials.

Magnetic materials having rectangular hysteresis loops have extensive application in present day technology, as in magnetic memory devices, for example. Materials having this property have been produced in the past either by applying a magnetic field to the material during a high temperature annealing process, by grain orientation obtained by drastic cold rolling reduction prior to final annealing, or by irradiating the material, while in the presence of a magnetic field, with neutrons derived from a nuclear reactor. The first two of the aforementioned methods require high temperature sources and magnetic field producing equipment; while the third mentioned method requires a costly nuclear reactor as a source of neutrons and makes imperative the taking of all precautions to avoid exposure of personnel to dangerous radiation. Moreover, the product of the third method is radioactive, while the product of the present invention is not radioactive. The present invention produces magnetic materials having rectangular hysteresis loops by bombarding the material with electrons while maintaining the temperature below the temperature at which permanent heat treatment effects occur, thus eliminating the use of high temperatures, induced magnetic fields, and expensive nuclear reactors.

It is an object of this invention to provide a new method for treating materials of high magnetic permeability to increase the steepness of the magnetization curves exhibited by these materials.

Another object of the invention is to provide a new method of treating materials of high magnetic permeability to exhibit hysteresis loops which are substantially rectangular.

Figure 1:
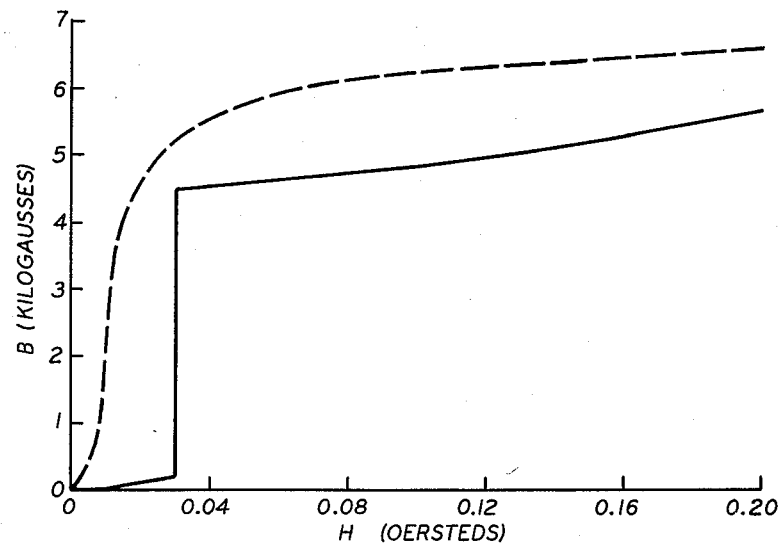
Figure 2:
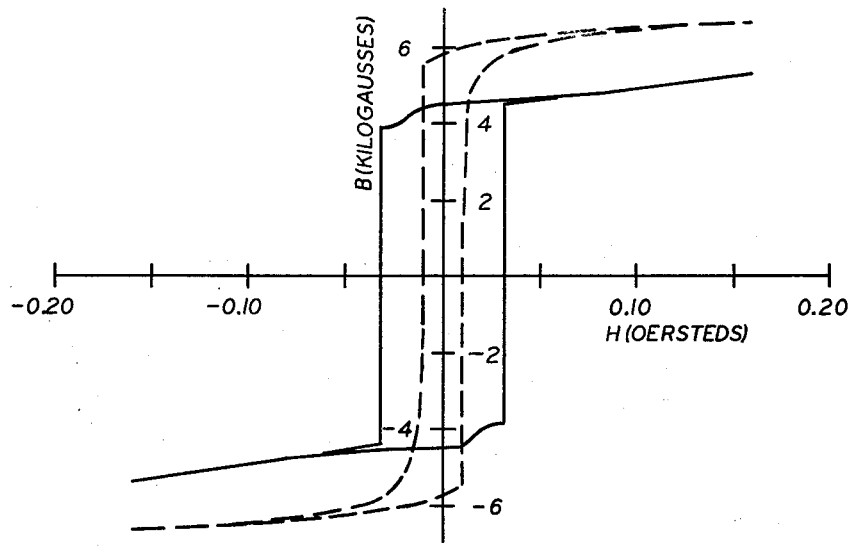

Other objects, advantages and novel features of the invention will become apparent from the following detailed description of the invention when considered in conjunction with the accompanying drawings wherein:

FIG. 1 illustrates a graph showing the increase in steepness of the magnetization curve exhibited by a specific material which was treated according to the method of this invention, and FIG. 2 shows a graph displaying the hysteresis loops of a magnetic core both before and after being treated according to the method of this invention.

In the practice of this invention, flat core materials are irradiated with electrons from a suitable electron source, such as a Van de Graaff accelerator, for example, while maintaining the temperature of the core materials generally low with respect to the ordering temperature of the material, i.e., maintaining the temperature of the material below that temperature at which permanent heat treatment effects are produced. It has been found that an electron beam having an energy level of at least 0.5 mev. will, when directed upon the core material, alter the magnetic properties of said material. As a result of this process, it is believed that certain of the atoms in the molecular lattice of the core material are dislodged from their normal position when bombarded by an electron beam, thus changing the ordering of the material and imparting to the material the characteristics of having a steep magnetization curve and a rectangular hysteresis loop.

By way of example, a punched ring of 5–79 Mo Permalloy (5% molybdenum, 79% nickel, and 16% iron) was treated according to the method of this invention in the following manner:

A punched ring of 5–79 Mo Permalloy having an inner diameter of ⅝" and an outer diameter of 13/16" and being .004" in thickness was irradiated with a 2 mev. electron beam for approximately 100 minutes to an integrated electron flux of $10^{17}$ electrons/cm.$^2$ at temperatures ranging from 60° C.–170° C. A Van de Graaff accelerator was used as the electron source and the ring was supported by an electrically conducting block which was electrically grounded to serve as an electron collector during irradiation. The block had internal passages formed therein to permit the flow of coolant therethrough and thus provided means to maintain the temperature of the material substantially below its ordering temperature. Now referring to FIG. 1, wherein the dotted line curve represents the magnetization curve of the ring of 5–79 Mo Permalloy prior to treatment in the manner described above and the solid line curve represents the ring's magnetization curve after treatment according to the method of this invention, it is evident that the treatment substantially increased the maximum slope of the magnetization curve. Referring to FIG. 2, wherein the hysteresis loop for the ring measured prior to irradiation is shown in dotted line form while the ring's hysteresis looped measured after irradiation is shown in solid line form, it may clearly be seen that the magnetic properties of the core material have been appreciably altered by the method of this invention and that the material now exhibits a hysteresis loop which approaches rectangularity to a far greater degree than did the hysteresis loop exhibited by the material prior to irradiation.

The method described above is intended to be no more than an example and is not intended to restrict the invention to the values and ranges specified. Some of the factors which may be selectively varied to change the resultant characteristics of the cores treated according to the method of this invention are the energy level of the electron beam, the current of the electron beam, the time of irradiation, the total integrated electron flux, the temperature of the core, and the thickness of the core. If desired, magnetic fields may be applied to the core during irradiation.

The above method expeditiously produces magnetic cores having steep magnetization curves and rectangular hysteresis loops from highly permeable magnetic materials.

Obviously many modifications and variations of the present invention are possible in light of the above teachings. It is therefore to be understood that within the scope of the appended claims the invention may be practiced otherwise than as specifically described.

What is claimed is:
1. A method of treating an alloy having high magnetic permeability consisting of
   continuously bombarding said alloy with a beam of electrons of at least 0.5 mev. to an integrated electron flux in an amount sufficient to cause the alloy to exhibit a substantially rectangular hysteresis loop, and
   cooling the alloy during the bombardment to maintain the temperature of the alloy below its ordering temperature.

2. The method of claim 1 wherein said alloy is an iron-nickel alloy having trace amounts of molybdenum therein.

3. A method of treating a punched ring of 5–79 Mo Permalloy containing 5% molybdenum, 79% nickel, and 16% iron and being approximately .004" in thickness, consisting of bombarding said ring with an electron beam of approximately 2 mev. for a period of approximately 100 minutes while simultaneously cooling the ring during the electron bombardment to maintain the temperature of said ring within the range of 60° C. to 170° C., thus imparting a rectangular hysteresis loop to said ring.

References Cited by the Examiner
UNITED STATES PATENTS 2,968,723   1/61   Steigerwald _____ 148—1.5

OTHER REFERENCES

Gordon et al.: Article in Solid State Physics in Electronics and Telecommunications, vol. 4, pages 824–858, September 1, 1960.

Seitz et al.: Article in Solid State Physics, vol. 2, pages 305–448, June 1956.

Sery et al.: Article in Journal of Applied Physics, vol. 34, pages 1311–1312, April 1963.

HYLAND BIZOT, *Primary Examiner.*

DAVID L. RECK, *Examiner.*